United States Patent [19]

Standing et al.

[11] 4,132,811
[45] Jan. 2, 1979

[54] FOOD PACKAGE FOR ASSURING UNIFORM DISTRIBUTION OF MICROWAVE ENERGY AND PROCESS FOR HEATING FOOD

[75] Inventors: Charles N. Standing; Lawrence C. Brandberg, both of Minneapolis, Minn.

[73] Assignee: The Pillsbury Company, Minneapolis, Minn.

[21] Appl. No.: 747,277

[22] Filed: Dec. 3, 1976

Related U.S. Application Data

[63] Continuation-in-part of Ser. No. 474,490, May 30, 1974, abandoned.

[51] Int. Cl.² .............................................. B65B 25/22
[52] U.S. Cl. ............................. 426/111; 219/10.55 M; 229/DIG. 3; 426/107; 426/113; 426/234; 219/10.55 E
[58] Field of Search ................. 219/10.55 E, 10.55 M, 219/10.55 R; 99/DIG. 14, 423; 426/107, 234, 243, 111, 113; 229/DIG. 3

[56] References Cited

U.S. PATENT DOCUMENTS

| 2,495,435 | 1/1950 | Welch | 426/234 |
| 3,182,166 | 5/1965 | Bohm et al. | 219/10.55 M |
| 3,672,907 | 6/1972 | Hudson | 426/120 |
| 3,721,371 | 3/1973 | Dolveck | 222/386.5 |
| 3,835,280 | 9/1974 | Gados et al. | 426/234 |
| 3,973,045 | 8/1976 | Brandberg et al. | 426/113 |
| 4,038,425 | 7/1977 | Brandberg et al. | 426/107 |

*Primary Examiner*—Steven L. Weinstein
*Attorney, Agent, or Firm*—James V. Harmon; Michael D. Ellwein

[57] ABSTRACT

To prevent localized overheating in food products which are to be heated in a microwave oven, an expandable vessel is operatively connected to a food product. When heated the vessel expands moving the food and thereby distributing non-uniformly distributed microwave energy more evenly throughout the food. In one embodiment, the vessel is a folded or coiled bag which retains steam and vapor evolved during the heating operation. The vapor expands the bag causing it to unfold i.e., straighten out thereby moving the food product from one location in the oven to another as microwave energy is applied.

10 Claims, 10 Drawing Figures

PROVIDE EXPANDABLE VESSEL
CONTAINING VAPORIZABLE LIQUID

PROVIDE OPERATIVE PHYSICAL
CONNECTION BETWEEN VESSEL
AND A FOOD TO BE WARMED
OR COOKED

EXPOSE FOOD AND VESSEL TO
MICROWAVE ENERGY SUFFICIENT
TO HEAT THE FOOD AND CAUSE
EXPANSION OF THE VAPOR CON-
TAINED IN THE VESSEL FORCING
THE FOOD TO MOVE BODILY FROM
ONE POSITION TO ANOTHER
WITH RESPECT TO THE OVEN

THE RESULTING MOVEMENT OF
THE FOOD DISTRIBUTING NON-
UNIFORM MICROWAVE ENERGY
THEREIN.

Fig 1

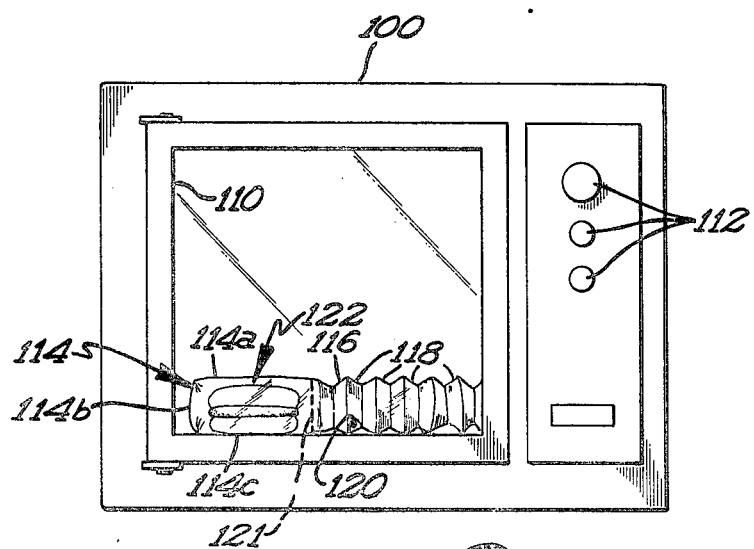

Fig 2

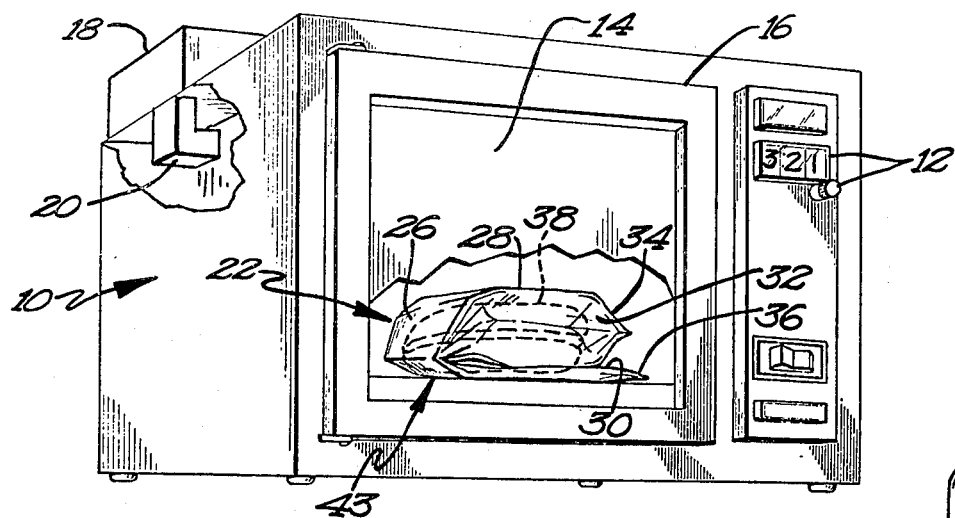
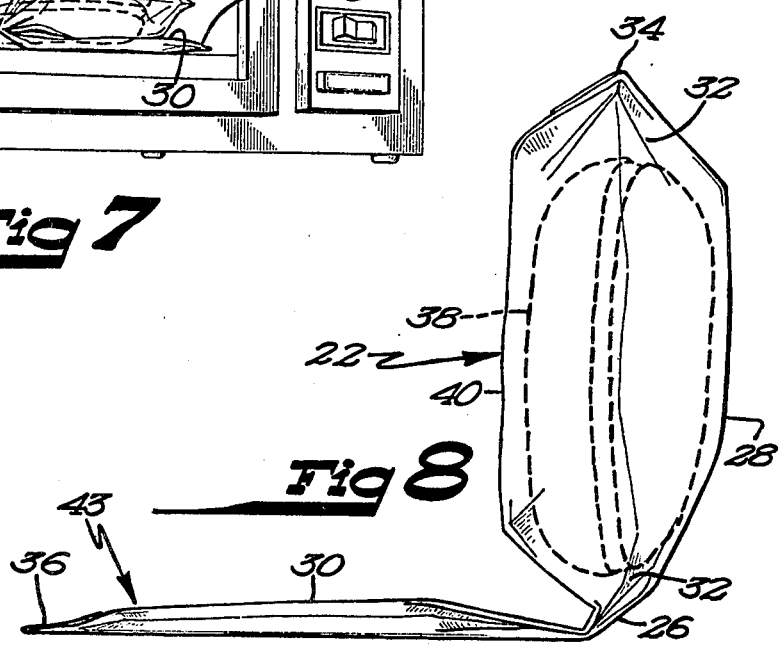
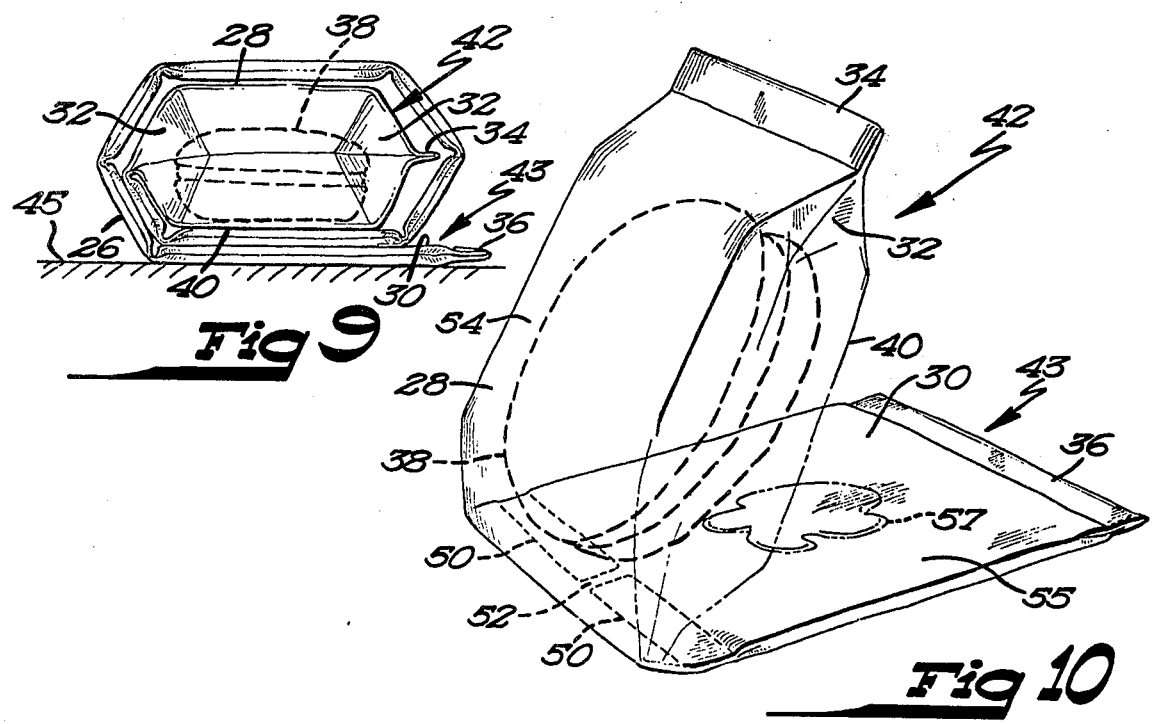

FOOD PACKAGE FOR ASSURING UNIFORM DISTRIBUTION OF MICROWAVE ENERGY AND PROCESS FOR HEATING FOOD

This application is a continuation-in-part of application Ser. No. 474,490 bearing the same title, filed May 30, 1974, now abandoned.

FIELD OF THE INVENTION

The present invention relates to food packages and more particularly to a package for heating food in a microwave oven and to a process for heating food.

THE PRIOR ART

Foods and especially frozen foods are heated non-uniformly in many if not all microwave ovens as a result of the non-uniform distribution of microwave energy throughout the oven. The chief objective of the invention is to insure more uniform distribution of microwave energy through food products to help prevent burning, dry spots, over cooking or cold spots. The system should be suited for use in a variety of microwave ovens. How large or small the hot and cold spots are in a given microwave oven will depend upon its type, the manufacturer and its design. Ovens now in use vary widely in this respect. In the Amana, Magic Chef and three different models of Litton oven, the hot and cold spots vary from only a fraction of an inch to several inches apart. Some ovens develop a very hot spot in the left rear portion of the oven chamber. Others seem to have randomly distributed hot and cold spots. It is not safe to make generalizations about how the hot and cold spots are distributed but regardless of how they are distributed, the invention was found to improve heat distribution in three different models of the Litton oven, the Amana oven and the Magic Chef oven and will function with a variety of foods such as pizza, popcorn, chicken, hot dishes and hot dogs as well as hamburgers etc.

THE OBJECTS

The major objects are (a) to provide more uniform exposure of food products to microwave energy in existing microwave ovens thereby making possible more uniform heating of the product, (b) consistent and reliable protection against non-uniform heating of food exposed to non-uniformly distributed microwave energy as the food is heated, (c) effective operation in a wide range of microwave ovens and (d) no requirement for oven modification.

THE FIGURES

FIG. 1 is a flow chart illustrating the steps performed in one embodiment of the invention. FIG. 2 is an elevational view of an oven and package of the invention.

FIG. 7 is a perspective view of yet another embodiment of the invention in an oven before heating.

FIG. 8 is a side elevational view on a larger scale of a package similar to that in FIG. 7 after heating.

FIG. 9 is a side view of another embodiment of the invention having a spiral form.

FIG. 10 is a perspective view of another form of the invention.

Figure 3:
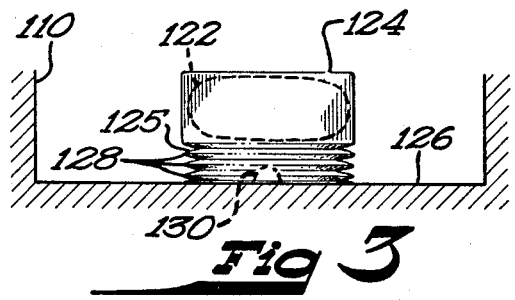
FIG. 3 is a semidiagramatic elevational view of another embodiment.

In the accomplishment of the foregoing and related advantages and objectives, this invention then comprises the features hereinafter fully described and particularly pointed out in the claims, the following description setting forth in detail certain illustrative embodiments of the invention these being indicative, however, of but a few of the various way in which the principles of the invention may be employed.

SUMMARY OF THE INVENTION

To prevent localized overheating or non-uniform heating of food products which are heated in a microwave oven in which the microwave energy is non-uniformly distributed, an expandable vessel is operatively connected to the food product and a vaporizable liquid is provided in the vessel. The food as well as gas or vaporizable liquid contained in the vessel is exposed to microwave energy causing the gas or vapor to expand thereby forcing the food product to move bodily from one position to another with respect to the microwave oven. The vessel can be separate from the box, bag or other package containing the food or in the alternative the vessel can be the same vessel that contains the food e.g., a folded or rolled i.e. coiled package such as a bag which retains steam and vapor evolved during the heating operation. As the bag or other package expands, the walls of the package are deflected outwardly causing the food product to move from one position in the oven to another.

Since the size and distribution of the hot and cold spots varies from oven to oven, it is difficult to make general statements about them. It can be said, however, that in some ovens the more the food product moves the better. In other ovens only a small amount of movement is necessary. Thus, it can be seen that with a small amount of movement, a small improvement can be achieved and with a greater amount of movement, a greater improvement is achieved. With the greatest amount of movement possible, the greatest possible improvement is achieved. Therefore, it is not the amount of movement that is so important but rather that the food moves in the first place. A movement of say even an eighth or a quarter of an inch might be considered useful in some cases.

THE PREFERRED EMBODIMENTS

Refer now to FIG. 2 which illustrates one form of the invention by way of example. As seen in the figure, there is provided a microwave oven 100 which can be either the type used in the home or a commercial unit for cooking or baking food. The oven is provided with the usual microwave baking chamber 110 and controls 112. Within the baking chamber 110 is provided a food package or container 114 which is formed from connected walls e.g. of paper, paperboard or plastic including walls 114a, 114b, 114c etc. to form a complete container.

Connected to the right hand side of the container 114 and forming an extension thereof is an expandable vessel 116 made of flexible sheet material such as paper, plastic film or the like or other suitable packaging materials containing accordian folds or pleats 118 to allow the vessel 116 to expand in a horizontal direction. The vessel 116 is closed at its right end and can either be open at the left end so as to communicate with the interior of the package 114 or if desired can be separated therefrom and from food 122 by a suitable barrier 121. The vessel 116 contains a vaporizable liquid 120 such as water, alcohol, hexane, or other liquid which vaporizes upon heating. The liquid, whether polar or non-polar, is preferred to have a boiling point of 90° F. or higher. If a non-polar organic liquid is used, it is preferred to use an organic liquid having a molecular weight of over 70 and under 120 examples of which are liquids having a chain length of from pentane to octane as well as a variety of other organic liquids such as alkenes, alkynes, etc. that will be apparent to those skilled in the art. Once the principles of the invention are understood, any suitable vaporizable liquid can be selected by one skilled in the art. The liquid does not enter into a chemical reaction but is instead utilized because of its ability to expand upon heating. Water is the most preferred liquid because of its availability, low cost and lack of toxicity. Still other liquids can be used in addition to those mentioned specifically above among which are polyfluorinated hydrocarbons and the like. If the liquid is in any way incompatible with foods, it is preferred to provide the barrier 121 between the food 122 and the vessel 116.

Before use, the accordian pleats or folds 118 are collapsed. The package 114 containing food 122 is placed in the microwave oven. The vessel 116 is placed directly against the right wall of the oven in this case to provide physical contact between the expandable vessel and the oven. The oven is then turned on causing vaporization of the liquid 120 and expansion of the accordian folds 118 of the expandable vessel 116. The operative physical connection between the food 122 and the expandable vessel 116 along the bottom surface of the food in this case causes the package 114 and the food contained therein to move bodily as vessel 116 expands from the right toward the left in the oven thereby distributing non-uniform microwave energy move evenly through the food product 122 as it is heated.

The amount of vapor present in vessel 116 is any amount sufficient upon being vaporized to cause the food product to move. Only a small amount of movement is effective in some cases but in general the more movement the better. The amount of liquid used can vary widely from a small amount to a very large amount. It is not the quantity of liquid that is critical but rather the presence or absence of liquid. The food product 122 when in the same vessel as the liquid 120 will generate pressure if the food contains a quantity of moisture. In the embodiment illustrated in FIG. 2, the liquid 120 is provided in addition to that present in the food product. The amount of liquid 120 present can be varied widely from only a few drops to as much as practical to carry in a container. For example, ten drops of liquid is effective to produce expansion of vessel 116.

In the event that the food product 122 itself contains a significant amount of moisture, say more than 2 or 3%, the moisture present in the food product can comprise the expandable liquid and accordingly no added liquid 120 needs to be provided. Thus for example, in the event that the food product 122 is a hamburger, it can be a small, medium or large hamburger and all will work with no added moisture. Thus, during operation as the hamburger 122 becomes hot, the moisture vapor contained therein will circulate through the package 114 and vessel 116 causing vessel 116 to expand as described above pushing the hamburger toward the left in the figure. It can be seen that it is not the quantity of liquid that is added at 120, it is the presence of the liquid that is important. As soon as the liquid becomes heated, it generates a volume of liquid vapor which moves the food product at least to some extent.

With regard to the pressure generated in the vessel 116, a fraction of the pound per square inch is usually satisfactory to move the product. If, for example, an area of 3" × 3" is considered to be the cross sectional area of a food product package as seen in plan view, a quarter pound food product needs only 1/36th psi to be lifted if the pressure is exerted from below.

The amount of movement necessary to prevent localized overheating depends upon how large or small the hot and cold spots are in a given microwave oven. As mentioned above, various ovens differ widely in this respect. Some may have hot spots one-quarter or one-eighth inch apart; others may have hot spots two to three inches apart. Movement as little as ⅛ or ¼ inches would be useful in some cases.

The package 114 is not essential to operation and can be omitted if the food requires no protection and partition 121 is present to close vessel 116 so that it is capable of holding pressure.

Refer now to FIG. 3 which illustrates another embodiment of the invention wherein the same numerals refer to corresponding parts in FIG. 2. As shown, the food product 122 is located within a box 124 such as a paper box within microwave oven chamber 110. Bonded to the lower surface of paper box 124 e.g. by adhesive is an expandable vessel 125 which rests against the bottom surface 126 of the oven chamber 110 when the package 124 is placed in the oven. The vessel 125 contains a plurality of horizontally extending accordian pleats 128 that enable it to expand vertically. The vessel 125 can be formed of any suitable well-known packaging material such as paper, plastic, laminates of paper and plastic, rubber, and the like and is completely closed on both the top and bottom surfaces. Within the vessel 125 is a vaporizable liquid such as water 130 or any of the liquids mentioned above.

In operation, when package 124 is placed in the microwave oven chamber 110 and the oven is activated, the vaporization of the liquid 130 will expand vessel 125 thereby raising the box 124. This causes the food to move bodily from one position to another, upwardly in this case, within the oven. The resulting movement of the food distributes non-uniform microwave energy within the food product 122 thereby providing move even heating and reducing the tendency for hot and cold spots to be present within the food product.

Figure 4:
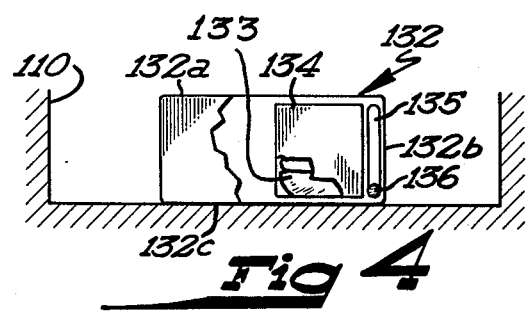
FIG. 4 is a semidiagramatic elevational view of another embodiment.

In FIG. 4 is shown a food package 132 located within microwave oven chamber 110 ready for heating. The package 132 comprises a paper or paperboard box including six rectangular walls 132a, 132b, 132c, etc. to form a complete box within which is provided a food container 134 that can also be formed from paper or paperboard resting on the bottom of the box 132 but not attached at any point to the box so that it is able to slide therein. The container 134 has in it a food product such as hamburger sandwich 133. Positioned between the container 134 and the side wall 132b of the box 132 is an expandable vessel 135 such as a rubber bladder containing a small amount of vaporizable liquid 136. For example if water is used, about one or two teaspoonsful will be sufficient.

When the oven is turned on the microwave energy will simultaneously heat the food 133 and vaporized liquid 136 thereby expanding the rubber bladder 135 causing the container 134 to slide toward the left in the figure within the box 132 which itself remains stationery. Because of the operative physical connection between the vessel 135 and container 134, the expansion of the vessel 135 moves the container 134 and food 133 relative to the oven thereby helping to equalize hot and cold spots which would otherwise be present in the food product 133.

Figure 5:
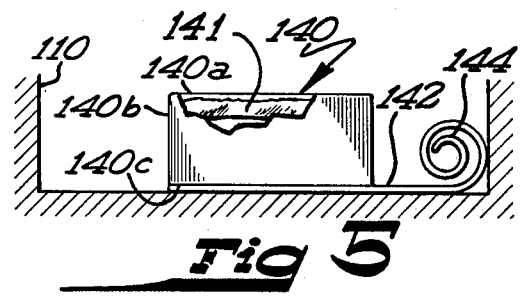
FIG. 5 is a semidiagramatic elevational view of another embodiment.

Refer now to FIG. 5 which illustrates still another form of the invention. As seen in the figure, a food container or box such as a paperboard box 140 containing a food product 141 is composed of six rectangular walls 140a, 140b and 140c etc. to form a complete box. Glued or otherwise fastened to the bottom wall 140c of the box 140 is an expandable elongated vessel 144 composed of a flattened tube sealed at both ends. The tube is hollow and contains a vaporizable liquid such as water (not shown) in a small amount e.g. a teaspoonful. The tube includes a straight portion secured to the box and a curled or spiraled portion 144 at the right end thereof which abuts against the wall of the oven chamber 110. Before the package is used the vessel comprising the tube 142 is completely collapsed and coiled tightly against the right side wall of the box 140. When the package is to be used, it is placed in the oven chamber 110 with the coil 144 against the right wall of the oven. When the oven is turned on, the food product 141 is heated and simultaneously the water within tube 142 is vaporized thereby causing the coil 144 to expand and extend toward the right. As it expands, the coil 144 unwinds causing the food 141 and package 140 to move toward the left in the oven. This movement helps to distribute non-uniform microwave energy through the food.

Figure 6:
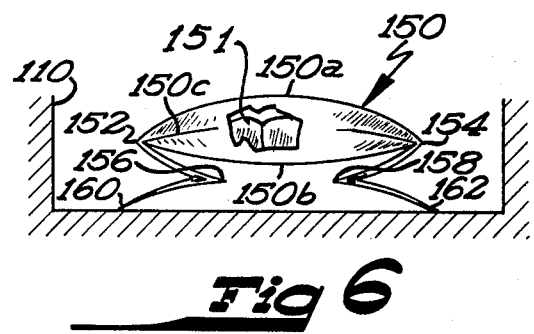
FIG. 6 is a semidiagramatic elevational view of another embodiment.

FIG. 6 illustrates another embodiment of the invention in which the package comprises a gusseted paper bag 150 having upper and lower walls 150a and 150b respectively which extend from one end to the other. The top end of the bag 150 is sealed shut by a transverse seal such as a glued seal 160. The bottom of the bag is closed by a transverse seal 162 similar to seal 160. The bag includes longitudinally extending side gussets 150c only one of which is shown. The bag 150 contains a food product 151 and is folded transversely at 152 and 154 at the top and bottom of the food product. Portions of the bag toward the bag ends from fold lines 152 and 154 are folded downwardly and centrally against the lower surface 150b of the bag. Two additional transverse seals 156 and 158 extend transversely of the bag and the bag sections distal thereof are folded back toward the bag end, i.e. towards fold lines 152 and 154. Thus, each end of the bag 150 is provided with a collapsed portion which is folded centrally and thence toward the bag end to provide two adjacent collapsed bag sections at each end which are folded against the center portion of the bag i.e. the part between fold lines 152 and 154.

Assuming the food product 151 contains moisture in any amount over an insignificant quantity, the bag 150 need contain no additional expandable liquid. Upon being heated, the moisture in food product 151 will be vaporized thereby expanding the bag 150 and particularly the collapsed portions between folds 152 and seal 160 and 154 and the seal 162. This causes the collapsed bag portions to extend downwardly thereby lifting the center portion of the bag containing food 151 upwardly as shown in FIG. 6 and accordingly moving it bodily within the oven chamber to thereby distribute non-uniform microwave energy through the food product. FIG. 6 illustrates an example of the invention wherein the expandable vessel is one and the same vessel in which the food itself is contained.

Shown in the FIG. 7 is a microwave oven 10 having controls 12, oven chamber 14, door 16 and a microwave generating unit 18 which is coupled at 20 to the oven chamber 14. A package 22 (FIGS. 7 and 8) which embodies the invention, comprises a substantially vapor tight flexible wall container 26 in this case in tubular form, preferably consisting of a bag formed from a flexible sheet material such as paper having usual sidewalls 28 and 30, longitudinal gussets 32 on each side and sealed ends 34 and 36. Within one end of the bag is a food product such as a hamburger sandwich 38.

The bag 26 is folded back upon itself by bringing the end seal 36 adjacent to the seal 34. This causes the face 30 of the bag to contact itself at 40. The bag 26 is in this embodiment folded through an angle of about 180°.

As shown in FIG. 9, which is otherwise the same as FIGS. 7 and 8, the bag may be somewhat longer and folded over and over several times i.e. coiled to form a spiral. The end portion 42 contains the food product 38. Food product 38 occupies only one end portion 42 of the bag, the other bag portion 43 is empty and is placed on the floor of the oven chamber 14. As shown in FIG. 9, the filled portion 42 defines the top of the bag before the package is heated. The unfilled portion 43 is placed on the bottom surface 45 of the oven chamber and defines the bottom of the bag.

During heating, moisture vapor or steam generated within the package expands causing an outward deflection of the sidewalls 28 and 30. This deflection in turn causes the food containing section 42 of the package 26 to unfold or unroll. Its free end then travels upwardly from right to left as seen in FIG. 9. As the food product moves through the oven it is exposed to microwave energy of varying flux density. This takes place rather slowly during a substantial portion of the heating cycle to assure uniform heating thereby averaging the conditions of exposure in different parts of the oven during heating.

The paper bag 26 need not be completely moisture proof but should provide a relatively good moisture barrier at least during the time the product is being heated so that a pressure can be developed. Excellent results have been obtained with a bleached kraft paper bag having a glassine liner. The bag should hold steam pressure for about 3 to 100 seconds. The kraft paper is preferably a wet strength paper.

While the hamburger sandwich has been shown for example, any moisture containing food is satisfactory, examples are frozen or refrigerated sandwiches, frozen pies, frozen french fries, frozen danish, frozen TV dinners, frozen meats and meat pies.

Refer now to FIG. 10 which illustrates a modified form of the invention similar to that of FIGS. 7 and 8 with certain modifications to be described below. The same numbers have been used for the corresponding parts illustrated in FIGS. 7 and 8.

In the bag 26 of FIG. 10, a transverse seal 50 is formed by bonding the wall 28 to wall 30 near the center of the bag. An optional unsealed section 52 provides a vent between the two chambers 54 and 55 thus formed. A food product 38 is placed in chamber 54 as shown. In chamber 55 is placed a small amount of water 57 which upon heating is vaporized causing food product 38 to move upwardly through a reorienting path either due to expansion of chamber 55 when the seal 50 has no vent i.e. is uninterrupted, or due to expansion of both chambers 54 and 55 when the seal 50 includes the vent 52 as shown in FIG. 10. The embodiment of FIG. 10 is especially suitable for food products which are relatively low in moisture such as cookies, cakes and biscuits.

What is claimed is:

1. A method for more uniformly exposing food products to microwave energy comprising, providing a package containing a vaporizable liquid having a food-filled portion and an expandable vessel, providing contact between the vessel and the food-filled portion, exposing the food-filled portion and the vessel to microwave energy sufficient to heat the food and vaporize the liquid to cause expansion of the vaporized liquid in the vessel, the vaporized liquid causing the vessel to expand and push against the food-filled portion to change the location thereof in the oven and thereby force the food to move bodily from one position to another with respect to the oven as a result of the expansion of the vessel and the resulting movement of the food distributing non-uniform microwave energy more uniformly in the food product, the vessel being vertically expandable and the food-filled portion being positioned on top of the vertically expandable vessel whereby expansion of the vessel moves the food-filled portion upwardly in the oven when the vessel is exposed to microwave energy.

2. A method for more uniformly exposing food products to microwave energy comprising, providing a flexible package containing a vaporizable liquid having a non-collapsed food-filled portion and an expandable collapsed vessel, providing contact between the vessel and the food-filled portion, exposing the food-filled portion and the vessel to microwave energy sufficient to heat the food and vaporize the liquid to cause expansion of the vaporized liquid in the vessel, the vaporized liquid causing the vessel to expand and push against the food-filled portion to change the location thereof in the oven and thereby force the food to move bodily from one position to another with respect to the oven as a result of the expansion of the vessel and the resulting movement of the food distributing non-uniform microwave energy more uniformly in the food product, the food-filled portion being positioned on top of the collapsed portion comprising the expandable vessel and the heating of the vessel and food product within the oven causing the vessel to expand thereby elevating the food-filled portion of the package containing the food product as the vessel expands to move the food product bodily from one position to another within the oven.

3. The method of claim 2 wherein the heating of the food vaporizes moisture therein and the vaporized moisture flows during heating from the uncollapsed portion of the package to the collapsed expandable vessel portion thereby expanding said vessel portion of the package.

4. The method of claim 2 wherein said collapsed vessel portion of the package contains water.

5. A process for more uniformly distributing microwave energy within moisture containing package having a food product therein wherein said package includes a bag sealed at each end, the bag having first and second walls and being formed from material which will hold moisture under pressure during a period of heating, said bag having first and second end portions, the food product being contained in said first end portion of the bag, said second end portion of the bag containing no food, said process comprising placing the bag in a microwave oven with the filled end portion of the bag folded on top of the second end portion which defines the base of the bag so that one wall of the bag is located adjacent to itself, exposing the bag to microwave energy sufficient to liberate moisture vapor during the heating of the food product and allowing the moisture vapor generated thereby to expand the walls of the bag and unfold the food containing end portion so as to cause the food product to move within the oven during exposure to the microwave energy.

6. A package for more uniformly exposing food products to microwave energy comprising a moisture containing packaging including a bag sealed at each end and having walls formed from a material which will hold moisture under pressure during a period of heating, said bag having first and second end portions, the food product within the bag being contained in said first end portion of the bag, said second end portion of the bag being empty, the filled portion comprising the top of the bag being folded onto the second end portion of the bag which comprises the base so that one wall of the bag is folded into contact with itself, a quantity of moisture in the second end portion of the bag defining the base, a transverse seal bonding said first and second walls together and extending across the bag between the end portions such that the moisture and food are on opposite sides of the seal, and an unsealed section provided in the seal to permit water vapor evolved in the base portion of the bag during heating to transfer into the filled portion of the bag and said quantity being sufficient to deflect the walls thereof outwardly and unfold the food containing end portion and shift the food product physically within the microwave oven responsive to the moisture vapor generated during microwave heating.

7. A process for more uniformly exposing moisture containing food products to microwave energy comprising inserting the food product into one end of a flexible walled container formed from sheet material capable of retaining mositure vapor during the heating thereof, sealing the container after inserting the food product, the filled portion of the container comprising one end portion thereof and the other end of the container being empty and comprising a collapsed portion defining the base of the package, the container being folded transversely at least once between the filled end portion and the collapsed portion at the other end, placing the package in a microwave oven with said one end portion uppermost and resting upon the collapsed base portion, exposing the package to microwave energy sufficient to vaporize moisture contained within the package and the evolved moisture expanding the walls of the package during heating to unfold the food containing end portion and cause the filled portion of the package to move upwardly when the package is heated to thereby change its position within the oven.

8. A two-part package for more uniformly exposing food products to microwave energy, the first part comprising a substantially fixed volume food containing package portion having a food product therein and a second portion comprising an expandable vessel contacting the food containing portion, said expandable vessel portion containing a vaporizable liquid and being formed from a material which will hold the vaporizable liquid during a period of heating, such that when the package is placed in a microwave oven the food product will be heated when the oven is turned on and simultaneously the vaporization of the heated liquid will expand the vessel and push on the fixed volume food containing portion moving the food product portion of the package and the food contained therein bodily from one position to another within the oven as the vessel expands, the expandable vessel portion of the package being accordian pleated to provide for said expansion.

9. A two-part package for more uniformly exposing food products to microwave energy, the first part comprising a substantially fixed volume food containing package portion having a food product therein and a second portion comprising an expandable vessel contacting the food containing portion, said expandable vessel portion containing a vaporizable liquid and being formed from a material which will hold the vaporizable liquid during a period of heating, such that when the package is placed in a microwave oven the food product will be heated when the oven is turned on and simultaneously the vaporization of the heated liquid will expand the vessel and push on the fixed volume food containing portion moving the food product portion of the package and the food contained therein bodily from one position to another within the oven as the vessel expands, the expandable vessel portion being a sealed collapsed tube a portion of which is coiled to provide for said expansion.

10. A method for more uniformly exposing food products to microwave energy within a microwave oven comprising, providing an expandable package, said package having a collapsed portion, said package containing a vaporizable liquid comprising water, placing food in a non-collapsed portion of the package providing contact between the collapsed portion and the non-collapsed food product containing portion, exposing the food and the package to microwave energy sufficient to heat the food and vaporize the liquid to cause expansion of the vaporized liquid, the vaporized liquid causing the collapsed portion of the package to expand and push against the uncollapsed food-filled portion to change the location thereof in the oven and thereby force all of the food to move bodily from one position to another with respect to the oven as a result of the expansion of the package, the resulting movement of the food distributing non-uniform microwave energy more uniformly in the food product.

* * * * *